March 15, 1932.    E. MADER    1,849,464
DEMOUNTABLE WHEEL RIM ASSEMBLY
Filed March 18, 1931    5 Sheets-Sheet 1
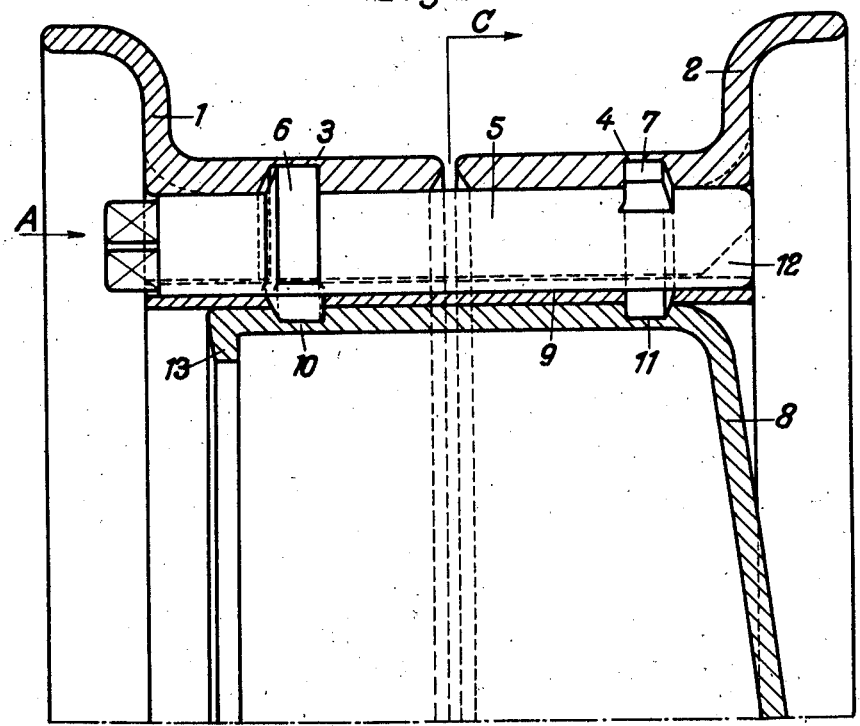
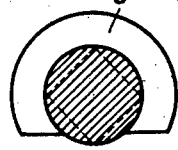
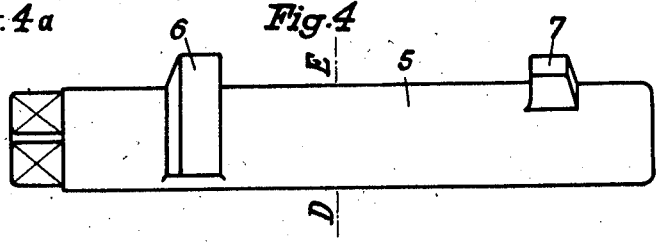

D-E

Inventor:
Emil Mader
By Bisinger, Atty

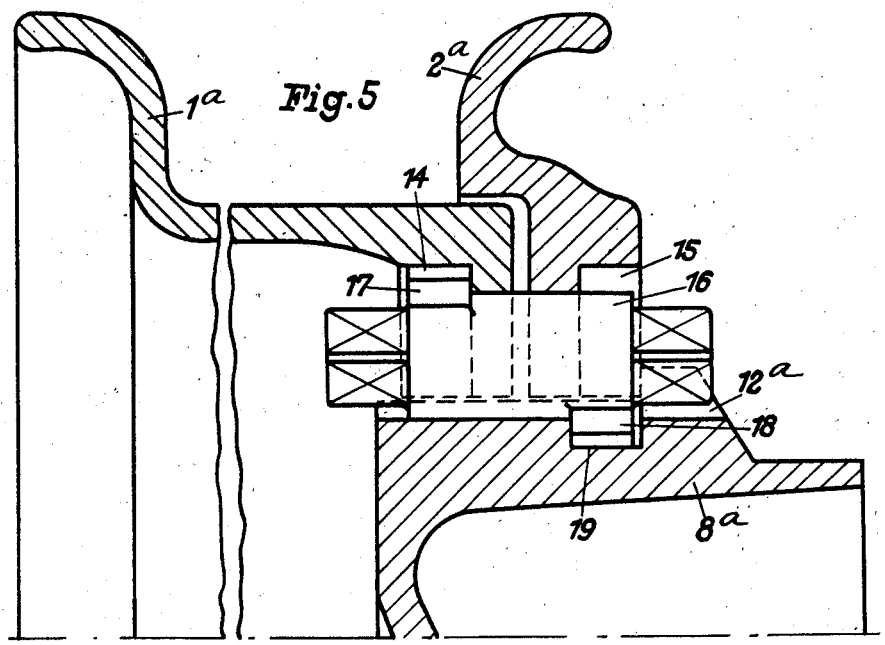
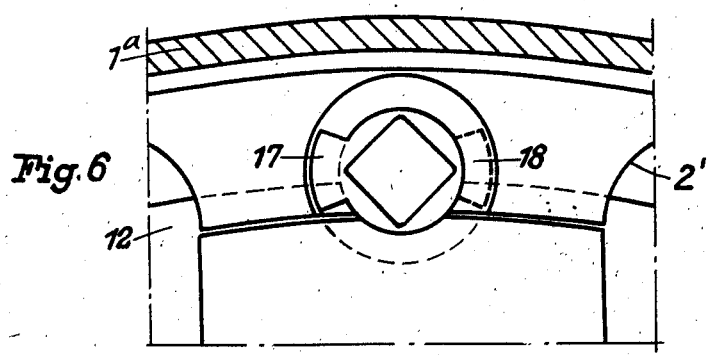
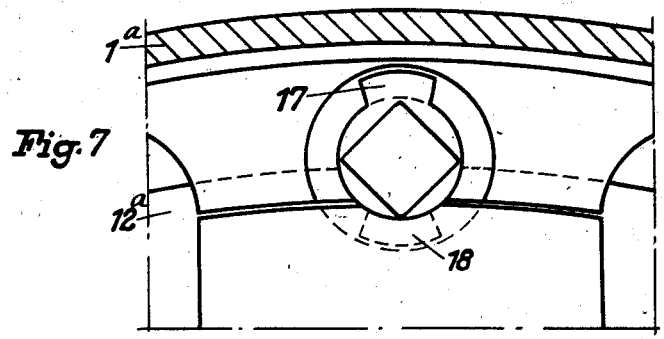

March 15, 1932.  E. MADER  1,849,464
DEMOUNTABLE WHEEL RIM ASSEMBLY
Filed March 18, 1931    5 Sheets-Sheet 4
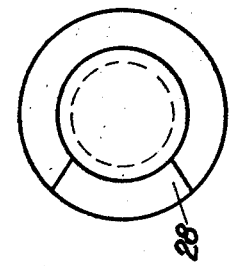
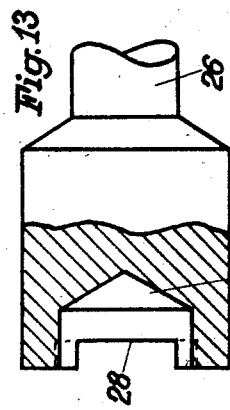
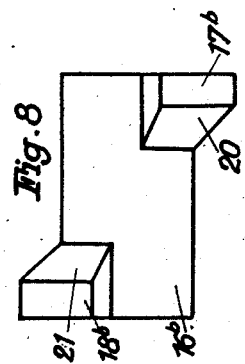
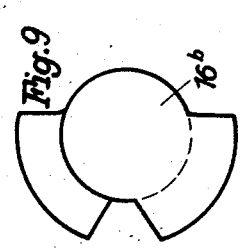
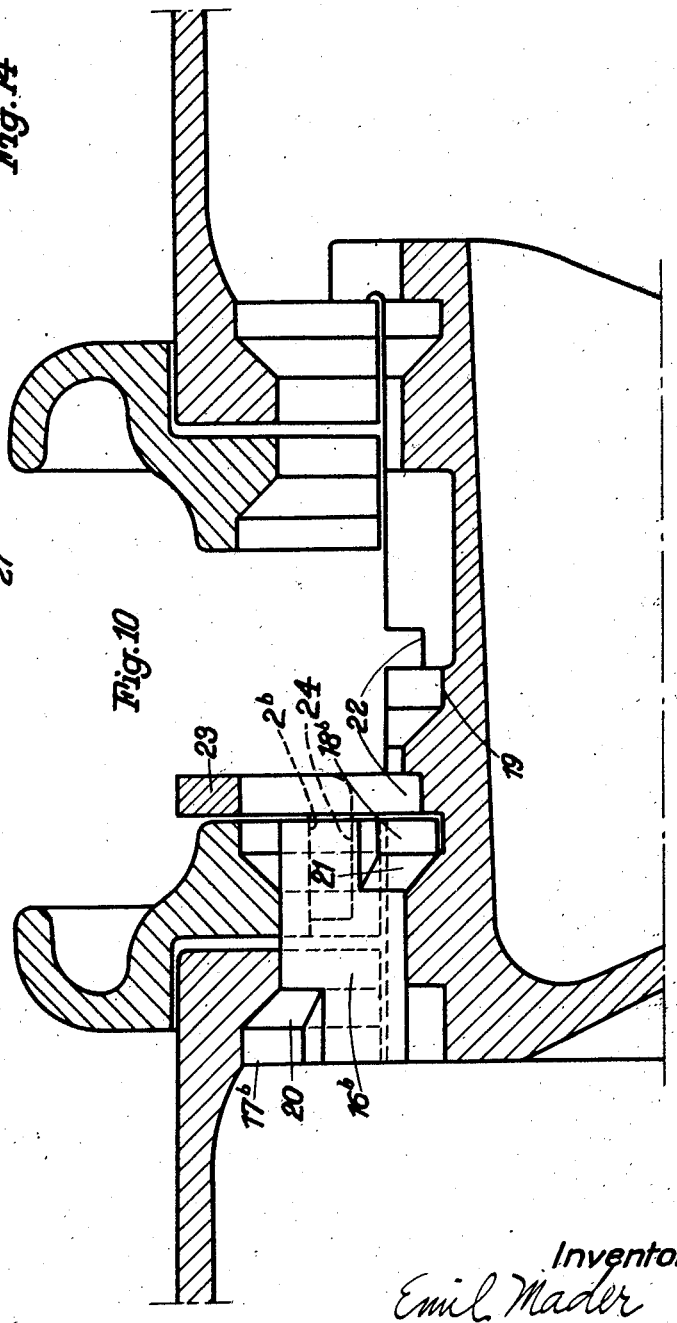
Inventor:
Emil Mader
By B. Linger, atty.

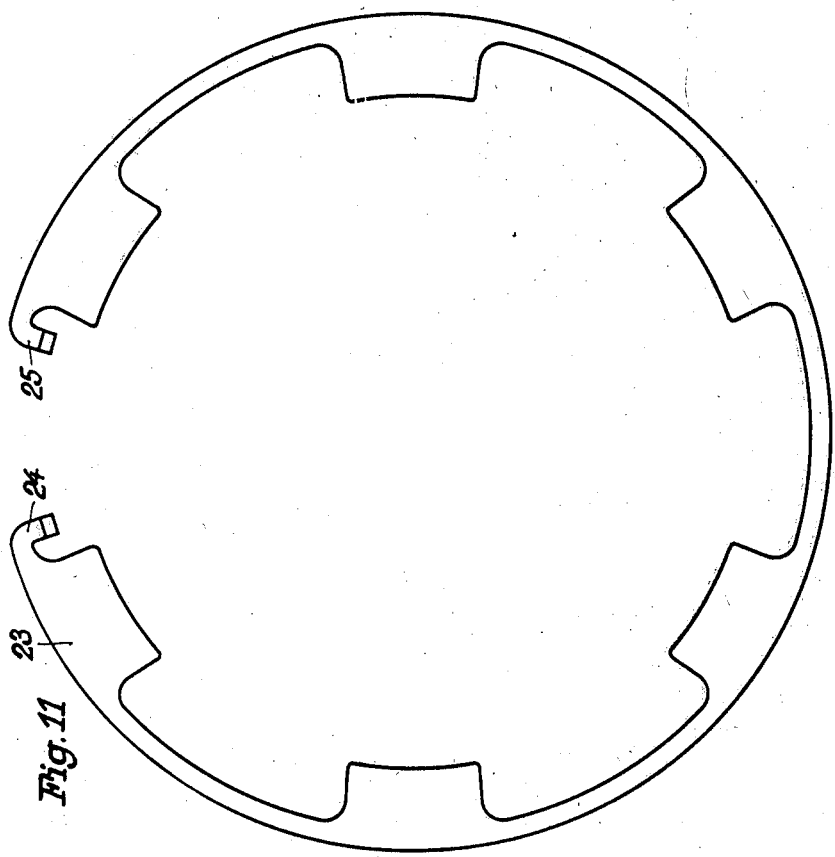

Patented Mar. 15, 1932

1,849,464

UNITED STATES PATENT OFFICE

EMIL MADER, OF PROSEN, NEAR ELSTERWERDA, GERMANY

DEMOUNTABLE WHEEL RIM ASSEMBLY

Application filed March 18, 1931, Serial No. 523,559, and in Germany December 12, 1929.

In circumferentially subdivided wheel rims it is known to unite the rim parts by bolts arranged in parallel to the wheel axis and having each a pair of enlargements. The same bolts serve also for fastening the rim parts to the wheel body.

This construction has the disadvantage that special clamping devices are necessary, if the rim with a mounted and blown up tire shall be fastened to the wheel body.

According to the invention, the bolts are in engagement on two grooved portions of the wheel body in such manner that in use one rim part is freed from the bolt and bears against an abutment of the wheel body.

Thereby it is attained that by rotating the bolt the rim parts joined to each other, including a blown up tire and mounted on the wheel body in the position of use the air pressure of the tire functions through the bolts and the felly, so as to hold all parts under tension and secured against loosening. All clamping screws or fastening devices are thereby entirely avoided.

Figure 3:
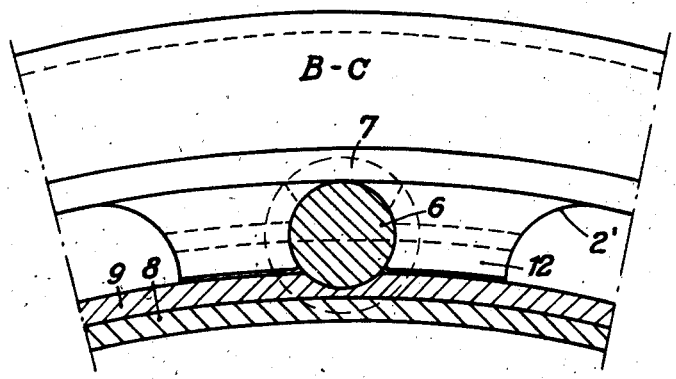
Figure 2:
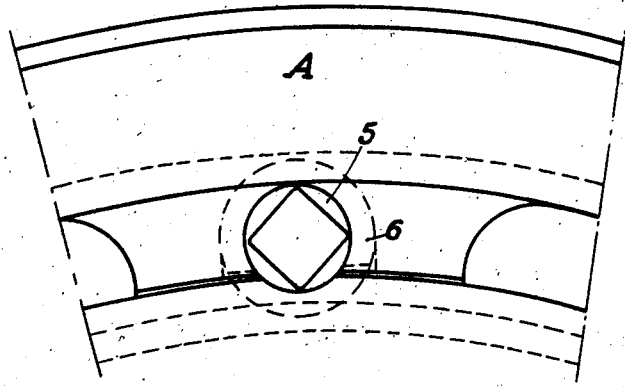

Some constructional examples of the invention are illustrated in the drawings, in which Fig. 1 is a section of the rims of a first example, Fig. 2 is a partial lateral view thereof, Fig. 3 is a section taken on line B—C of Fig. 1, Figs. 4, 4a and 4b are a lateral view and two end views of the bolt having two enlargements, Fig. 5 is a section of another example, Fig. 6 is a partial lateral view thereof, the bolt uniting only the rim halves, Fig. 7 is a partial lateral view thereof, the bolt joining the rim parts to the wheel body, Figs. 8 and 9 are a lateral and an end view of a bolt of different shape, Fig. 10 is a section of a twin wheel arrangement, Figs. 11 and 12 are a lateral view and a cross section of a yielding ring, Figs. 13 and 14 are a lateral view, partly in section, and an end view of a screw wrench serving for handling the bolts.

Figure 4B:
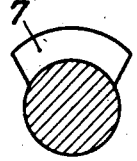

According to Figs. 1 to 4b, a rim consists of two portions 1, 2 of advantageously equal axial dimensions, and grooves 3, 4 are worked in said portions for receiving enlargements or shoulders 6, 7 of a bolt 5. One shoulder 6 covers about 220° of the bolt periphery and the other shoulder 7 about 70° (Fig. 4). The wheel body 8 and its felly 9 are also provided with grooves 10, 11 in opposition to said grooves 3, 4. The grooves 4 and 11 correspond to the shape of one shoulder 7, and further the groove 10 to the shape of the other shoulder 6, whereas the groove 3 is somewhat larger for certain reasons.

Several abutments 12 are provided on one side of the wheel 8, 9, and an inwardly bent flange or border 13 on its other side.

The action is as follows:

At first the rim part 1 is united with the bolts 5, and thereupon the complete tire is mounted on said portion. The second rim part 2 is thereafter placed on the projecting bolts 5, the shoulders 7 of which are all turned against the centre of the rim. The bolts 5 are then turned each by an angle of about 180°, so that the shoulders 7 are directed radially outward and the flattened faces of the shoulders 6 against the centre. Thereby both rim parts are safely united to each other, and the tyre may be filled with compressed air for being mounted on the wheel or for being taken along as a spare tire in condition ready for use. The shoulders 6 and 7 take up the tire pressure and join the rim halves together.

For mounting the rims and tyre on the wheel of a car the rims are put on the wheel 8, 9 up to the abutment 12, so that an axial displacement to the right side is prevented. A peripheral displacement, tending to arise by braking, is prevented by the bolts 5 engaging in the grooves of the wheel body. The bolts and grooves are worked to slidingly fit to each other, whereas the other surfaces have sufficient play. The bolt 5 is then turned by 180° by aid of a screw wrench, and advantageously a pressure lever is inserted in the border 13 so as to press on the rim and unload the bolt, which then can easily be turned by a special square bored screw wrench.

The action and positions of the bolt are therefore as follows.

During mounting the rims on the wheel at first the shoulders 6, 7 grip only the rim halves 1, 2. In turning the bolt, the shoulder 6 engages the groove 10 of the wheel body 8, 9, and this commences already at a rotation by 5°. The shoulder 7 grips still the rim part 2, and commences only on a rotation by 110° to leave the rim, whereas the shoulder 6 then already engages the wheel body by about 105°. Therefore, if the bolt after being put on the wheel is rotated by 180°, the shoulder 6 has its flattened face directed outward, so that about 120° of it are enclosed in the wheel body and 120° (60° on each side of the bolt) in the rim. In this position the shoulder 7 is positioned in the wheel body, so that the rim part 2 is free from it and is held by the abutment 12 of the wheel body. The bolt 5 is held on the wheel body by its shoulders 6, 7. The pressure of the tire is transmitted by the 120°-portion of the shoulder 6 to the bolt and distributed on both shoulders 6 (110°) and 7 (70°), so that the bolt and the shoulders work under extraordinarily favorable conditions.

According to Figs. 5 to 14, the invention is still further elaborated therein, that the bolts engage in a single grooved portion of the wheel body, and one rim part is in use position freed from the bolt and held by an abutment of the wheel body, without the necessity of using special pressing devices.

The rim consists again of parts 1a, 2a provided with recesses 14, 15. A bolt 16 is provided with shoulders 17, 18 fitting to said recesses 14, 15 respectively. The wheel body 8a is provided with recesses 19 of larger breadth than the shoulder 18 and than the oppositely provided recess 15. The abutments 12a have the same action as above described in connection with Figs. 1 to 4.

The shoulders 17, 18 of the bolt 16 are of equal size, covering about 70°, and are angularly displaced against each other by any desired angle. The shoulders of the bolts may advantageously have oblique faces 20, 21 (Fig. 8) to better sustain the tire pressure.

The larger size of the excavation 19 with respect to the recess 15 has the effect, that, when the bolt 16 is in use position and disengaged from the rim 2a, the latter applies to the abutment 12a, whereas the rim 1a draws the bolt in the opposite direction so that its shoulder 18 can no longer enter the recess 15 and thereby the bolt is secured against any unwanted rotation (Fig. 5).

In twin wheels according to Fig. 10, several recesses 19b are provided behind each other, for thereby allowing of varying the distances of the tyre middle planes against each other. In place of the abutments 12 or 12a, a yielding ring 23 is inserted in a special peripheral groove 22 of the wheel body.

The said yielding ring 23, shown in Figs. 11 and 12, is slotted and bent off on the ends in the shape of hooks 24, 25 which fit onto recesses 2b of the rims. Thereby the loose ring 23 is secured against rotary displacement and against radial coming out from the annular grooves.

Instead of a yielding ring also an abutment may be formed of several ring parts which act in the same manner as the yielding ring.

A screw wrench 26 (Figs. 13 and 14) serves for turning the bolt 16b, 17b, 18b (Figures 8 and 9). It consists of a member having a bore 27 of a somewhat larger diameter than the bolt and a sector shaped recess 28 covering somewhat more than 70° and able to enclose the shoulder 17b or 18b.

The bolt has several tasks: When dismantled from the wheel body, the rim halves or rim parts are held together by said bolt and in their turn contain the blown up air tire, so that the bolt serves as a clamping device. Further, in connection with the wheel body, the shoulders in consequence of their special arrangement serve by aid of a rotation of the bolt for securing the rims and the blown up tire to the wheel body, and at the same time both rims remain continuously held to each other, so as to be completely secured against any jumping away from each other.

I claim:

1. A demountable wheel rim assembly comprising in combination a felly forming part of a wheel body, a circumferentially divided rim having two removable rim parts adapted to be axially juxtaposed on said felly, an axial abutment on said felly for said removable rim, a plurality of bearings on the rim part remote from said abutment, a plurality of fork-shaped projections on the rim part adjacent said abutment, axial bolts rotatably held in said bearings and traversing said projections, each of said bolts having a first shoulder adapted to engage the respective bearing, and a second shoulder adapted to engage the respective fork arm and to disengage therefrom in a special rotation position of said bolt, any of said shoulders engaging said felly in said special rotative position, so as to hold said bolt against axial displacement to the side remote from said abutment.

2. A demountable wheel rim assembly as claimed in claim 1, wherein said forks are open against the center of the wheel, and the second shoulders of the bolts are of a sector shape adapted to fit between the arms of the open fork and engage the felly.

3. A demountable wheel rim assembly as claimed in claim 1, wherein the shoulders have the shape of sectors extending in different radial directions of the bolts.

4. A demountable wheel rim assembly as claimed in claim 1, wherein one shoulder is inserted with axial play in the respective rim part.

5. A demountable wheel rim assembly as claimed in claim 1, wherein the shoulder nearest to the abutment is inserted with axial play in the wheel body rim.

6. A demountable wheel rim assembly as claimed in claim 1, wherein the shoulders on their sides directed against each other have conical surfaces, and the rim parts have excavations fitting thereto.

7. A demountable wheel rim assembly comprising in combination a felly forming part of a wheel body and provided with a circumferential groove, an annular member adapted to be inserted in said groove and projecting outwardly for serving as an axial abutment, a circumferentially divided rim having two removable rim parts adapted to be axially juxtaposed on said felly, axial bolts enclosed between said felly and rim, and two shoulders on each of said bolts for uniting said removable rim parts in one rotative position of said bolts, and for engaging said felly and loosening the rim part neighbored to said abutment in another position.

8. A demountable wheel rim assembly as claimed in claim 7, wherein the abutment has a radial slot and axially projecting hooks on its ends near said slot, and the adjoining rim part has axial recesses for receiving said hooks.

In witness whereof I affix my signature.

EMIL MADER.